US011954733B1

(12) United States Patent
Boraiah et al.

(10) Patent No.: US 11,954,733 B1
(45) Date of Patent: Apr. 9, 2024

(54) CUSTOMIZABLE INVESTMENT PLATFORM

(71) Applicant: Wells Fargo Bank, N.A., San Francisco, CA (US)

(72) Inventors: Manjunath Boraiah, San Francisco, CA (US); David James Newton, II, San Francisco, CA (US); Brian Prucyk, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 107 days.

(21) Appl. No.: 17/150,773

(22) Filed: Jan. 15, 2021

(51) Int. Cl.
*G06Q 40/00* (2023.01)
*G06F 16/22* (2019.01)
*G06F 16/27* (2019.01)
*G06Q 30/0282* (2023.01)
*G06Q 40/03* (2023.01)
*G06Q 40/06* (2012.01)
(Continued)

(52) U.S. Cl.
CPC ......... *G06Q 40/06* (2013.01); *G06F 16/2264* (2019.01); *G06F 16/27* (2019.01); *G06Q 30/0282* (2013.01); *G06Q 40/03* (2023.01); *G06Q 40/10* (2013.01); *H04L 67/125* (2013.01)

(58) Field of Classification Search
CPC .... G06Q 40/00; G06Q 40/06; G06Q 30/0282; G06Q 40/025; G06Q 40/10; G06F 16/27; G06F 16/2264; H04L 67/125
See application file for complete search history.

(56) References Cited

U.S. PATENT DOCUMENTS

| 7,249,080 B1 * | 7/2007 | Hoffman ................ G06Q 40/06 |
| | | 705/37 |
| 7,783,545 B2 | 8/2010 | Sloan et al. |
| 7,860,774 B1 | 12/2010 | Peterson et al. |

(Continued)

FOREIGN PATENT DOCUMENTS

| CN | 111724266 A * | 9/2020 | ......... G06Q 10/0635 |
| WO | WO-03034180 A2 * | 4/2003 | ............. G06Q 40/06 |

OTHER PUBLICATIONS

Analyst recommendations, mutual fund herding, and overreaction in stock prices NC Brown, KD Wei, R Wermers—Management Science, 2014—pubsonline.informs.org (Year: 2014).*

(Continued)

*Primary Examiner* — Lalita M Hamilton
(74) *Attorney, Agent, or Firm* — Foley & Lardner LLP

(57) ABSTRACT

A computing system includes a network interface circuit and a processing circuit configured to receive a plurality of issuer ratings associated with issuers from a plurality of analyst devices, wherein the plurality of issuer ratings include qualitative ratings, generate numerical quality ratings for the issuers based on the qualitative ratings of the issuers, receive a plurality of investment parameters from a manager device, the plurality of investment parameters defining characteristics of a custom investment strategy, generate a dataset regarding securities issued by the issuers based on the numerical quality ratings of the issuers, the dataset including securities issued by the issuers having a numerical quality rating over a pre-determined value, generate the custom investment strategy by selecting securities from the dataset based on the numerical quality ratings and the plurality of investment parameters, and provide the custom investment strategy to the manager device.

14 Claims, 7 Drawing Sheets

(51) Int. Cl.
*G06Q 40/10* (2023.01)
*H04L 67/125* (2022.01)

(56) References Cited

U.S. PATENT DOCUMENTS

| | | | |
|---|---|---|---|
| 8,170,894 | B2 | 5/2012 | Yitts |
| 8,170,942 | B2 | 5/2012 | Mead et al. |
| 8,374,937 | B2 | 2/2013 | Arnott et al. |
| RE44,362 | E | 7/2013 | Arnott et al. |
| 8,589,276 | B2 | 11/2013 | Arnott et al. |
| 8,682,767 | B2 | 3/2014 | Brazdzionis et al. |
| 8,694,402 | B2 | 4/2014 | Arnott et al. |
| 10,026,108 | B2 | 7/2018 | Jackson et al. |
| 10,074,079 | B2 | 9/2018 | Kapoustin |
| 11,449,942 | B2 * | 9/2022 | Basu .................. G06T 11/206 |
| 2002/0138383 | A1 | 9/2002 | Rhee |
| 2002/0152151 | A1 | 10/2002 | Baughman et al. |
| 2003/0093352 | A1 * | 5/2003 | Muralidhar ............ G06Q 40/06 |
| | | | 705/36 R |
| 2004/0054610 | A1 | 3/2004 | Amstutz et al. |
| 2005/0251475 | A1 * | 11/2005 | Sato ...................... G06Q 20/10 |
| | | | 705/39 |
| 2007/0112662 | A1 | 5/2007 | Kumar |
| 2007/0271197 | A1 | 11/2007 | Law |
| 2010/0145715 | A1 | 6/2010 | Cohen |
| 2010/0191670 | A1 * | 7/2010 | Condon ............... G06Q 40/025 |
| | | | 705/36 R |
| 2011/0054860 | A1 | 3/2011 | Guild et al. |
| 2012/0023006 | A1 * | 1/2012 | Roser .................... G06Q 40/00 |
| | | | 706/12 |
| 2014/0164290 | A1 | 6/2014 | Salter |
| 2016/0155200 | A1 * | 6/2016 | Basu ...................... G06F 3/0484 |
| | | | 705/36 R |
| 2019/0012252 | A1 | 1/2019 | Kapoustin |
| 2020/0167869 | A1 * | 5/2020 | Magdelinic ........ G06Q 30/0206 |

OTHER PUBLICATIONS

Murphy, Chris B. "The Information Ratio Helps Measure Portfolio Performance." Investopedia, Investopedia, Oct. 27, 2020, www.investopedia.com/terms/i/informationratio.asp.

* cited by examiner

FIG. 6

| $AAPL | |
|---|---|
| Industry | Tech |
| Current Price | 117.09 |
| PE Ratio | 50.06 |
| Profit Margin | 21.33 |
| Debt/Equity Ratio | 1.3 |
| Industry Rating | 8 |
| Profitability Rating | 9 |
| Valuation Rating | 2 |
| Growth Rating | 5 |
| Health Rating | 6 |
| Dividend Rating | 6 |
| Relative Value | Overweight |
| Fundamental Recommendation | Improving |

| Time | Tick... | Src | Security | B Px | B Sprd | B Sz | A Sz | S&P | Moo... | Coup... | Maturity |
|---|---|---|---|---|---|---|---|---|---|---|---|
| 15:05 | PCAR | RUN | PCAR 3.15 08/09/21 | | | 2MM x | 250M | A+ | A1 | 3.15 | 08/09/21 |
| 15:05 | TEL | RUN | TEL 3.7 02/15/26 | | 76.00 | 1MM x | | A- | Baa1 | 3.7 | 02/15/26 |
| 15:05 | APTV | RUN | APTV 4.35 01/15/25 | 114.638 | 61.00 | 1MM x | | BBB | Baa2 | 4.35 | 01/15/25 |
| 15:05 | T | RUN | T 3.95 01/15/25 | | 45.00 | 1MM x | | BBB | Baa2 | 3.95 | 01/15/25 |
| 15:05 | ORLY | RUN | ORLY 3.9 06/01/29 | 115.241 | 78.00 | 1MM x | | BBB | Baa2 | 3.9 | 06/01/29 |
| 15:05 | PCAR | RUN | PCAR 2 09/26/22 | | 18.00 | 2MM x | | A+ | A1 | 2 | 09/26/22 |
| 15:05 | QCOM | RUN | QCOM 4.65 05/20/35 | 129.244 | 110.00 | 1MM x | | A- | A2 | 4.65 | 05/20/35 |
| 15:05 | ADSK | RUN | ADSK 2.85 01/15/30 | 888.551 | 70.00 | 1MM x | | BBB | Baa2 | 2.85 | 01/15/30 |
| 15:05 | ADSK | RUN | ADSK 3 ½ 06/15/27 | 111.8895 | 100.00 | 1MM x | | BBB | Baa2 | 3.5 | 06/15/27 |
| 15:05 | DT | RUN | DT 4 ¾ 06/21/38 | 123.4664 | 115.00 | 1MM x | | BBB | Baa3 | 4.75 | 06/21/38 |
| 15:05 | QCOM | RUN | QCOM 3.45 05/20/25 | | 45.00 | 1MM x | | A- | A2 | 3.45 | 05/20/25 |
| 15:05 | AAPL | RUN | AAPL 2.2 09/11/29 | 105.5901 | 40.00 | 1MM x | | AA+ | Aa1 | 2.2 | 09/11/29 |
| 15:05 | AAPL | RUN | AAPL 3 11/13/27 | 111.5520 | 70.00 | 1MM x | | AA+ | Aa1 | 3 | 11/13/27 |
| 15:05 | AAPL | RUN | AAPL 2.45 08/04/26 | 107.665 | 50.00 | 1MM x | | AA+ | Aa1 | 2.45 | 08/04/26 |
| 15:05 | AAPL | RUN | AAPL 3 08/20/27 | 111.165 | 65.00 | 1MM x | | AA+ | Aa1 | 3 | 08/20/27 |
| 15:05 | AAPL | RUN | AAPL 3.9 09/12/27 | 110.619 | 70.00 | 1MM x | | AA+ | Aa1 | 2.9 | 09/12/27 |
| 15:05 | AAPL | RUN | AAPL 0.53 08/20/25 | | 30.00 | 1MM x | | AA+ | Aa1 | 0.53 | 08/20/25 |
| 15:05 | TMUS | RUN | TMUS 2.05 02/15/28 | 102.314 | 90.00 | 1MM x | | BBB- | Baa3 | 2.05 | 02/15/28 |
| 15:05 | AAPL | RUN | AAPL 2.05 09/11/26 | 105.732 | 50.00 | 1MM x | | AA+ | Aa1 | 2.05 | 09/11/26 |
| 15:05 | AAPL | RUN | AAPL 3.2 05/13/27 | 112.146 | 65.00 | 1MM x | | AA+ | Aa1 | 3.2 | 05/13/27 |

Customized Investment Strategies

| Scenarios | Tax Liability | Active Risk (%) |
|---|---|---|
| $0 Tax Liability | $0 | 3.05% |
| Balanced Trade-Off 1 | $51,642 | 2.45% |
| Balanced Trade-Off 2 | $109,290 | 1.86% |
| Balanced Trade-Off 3 | $175,987 | 1.27% |
| Lowest TE | $372,298 | 0.00% |

Investment Parameters

| Security Characteristics | |
|---|---|
| Types Securities? | Corporate Bonds |
| Ratings? | Investment Grade Only |
| Minimum Duration? | 0.5 Years |
| Maximum Duration? | 15 Years |
| Issuer Liquidity? | Market Value > $2 Billion |
| Liquidity Score? | > 75 |
| Minimum Tradable Amount? | < $2,000 |
| Minimum Holding? | < $5,000 |
| Ladder Characteristics | |
| Tax Loss Harvesting? | Yes |
| State Concentration? | US Only |
| Credit Quality? | A or better |
| Duration? | 25 Years |
| Coupon Payments? | Annual |
| Acceptable Risk? | Low |

FIG. 7

CUSTOMIZABLE INVESTMENT PLATFORM

TECHNICAL FIELD

The described aspects and embodiments relate to a customizable investment platform. More particularly, the described aspects and embodiments relate to a technical data capture architecture for gathering information related to security issuers and generating a graphical user interface to display the gathered information.

BACKGROUND

There are many strategies that may be considered when investing in securities (i.e., stocks, bonds, mutual funds, option contracts, exchange-traded funds or other types of investments you can buy or sell). Provider institutions, such as investment banking firms, private equity funds, hedge funds, etc. that invest in securities are often split into investment teams that may manage their own portfolios. Each investment team may include one or more portfolio managers (PMs) and one or more analysts. Generally, analysts perform market research and report findings to the PMs who then make investment decisions for the portfolio.

Each investment team may utilize different strategies when deciding how to manage their portfolios (buy, sell, hold securities, etc.). The PM(s) leading each investment team may also have his or her own personal biases that influence these decisions. Further, each analyst may utilize different theories, strategies, and beliefs when performing market research. Each investment team is generally isolated from other investment teams within the same provider institution. For example, information about the securities, such as ratings, price targets, estimated holding periods, etc., may not be routinely shared between various investment teams even within the same provider institution. Further, each analyst may record his or her own notes on the security in a different manner such that gathering and reviewing notes on various securities from several analysts, especially across different teams, may be time consuming due to the non-uniform nature of the notes.

SUMMARY

A first example embodiment relates to a computing system. The computing system includes a network interface circuit configured to enable data transmission over a network, and a processing circuit coupled to the network interface circuit, the processing circuit comprising one or more processors coupled to non-transitory memory, wherein the processing circuit is configured to receive a plurality of issuer ratings associated with issuers from a plurality of analyst devices, wherein the plurality of issuer ratings include qualitative ratings that provide an indication of an analyst's opinion of each issuer, generate numerical quality ratings for the issuers based on the qualitative ratings of the issuers, receive a plurality of investment parameters from a manager device that is separate and distinct from the plurality of analyst devices, the plurality of investment parameters defining characteristics of a custom investment strategy, generate a dataset regarding securities issued by the issuers based on the numerical quality ratings of the issuers, the dataset including securities issued by the issuers having a numerical quality rating over a pre-determined value, generate the custom investment strategy by selecting securities from the dataset based on the numerical quality ratings and the plurality of investment parameters, and provide the custom investment strategy to the manager device.

Another example embodiment relates to a system. The system includes a network interface circuit configured to facilitate data transmission over a network, and a processing circuit including one or more processors coupled to non-transitory memory. The processing circuit is configured to provide a plurality of analyst applications to a plurality of analyst computing devices associated with a plurality of analysts, wherein each analyst application is configured to display a plurality of issuer rating fields, receive issuer ratings associated with a plurality of issuers from the plurality of analyst applications of the plurality of analyst computing devices via the plurality of issuer rating fields, wherein the issuer ratings include qualitative ratings that provide an indication of an analyst's opinion of the plurality issuers, integrate the issuer ratings to generate quality ratings for the plurality of issuers based on the issuer ratings, receive investment parameters from a manager device via a plurality of investment parameter fields, the investment parameters defining characteristics of a custom investment strategy, generate a dataset regarding securities issued by the plurality of issuers based on the quality ratings of the plurality of issuers, the dataset including securities issued by issuers having a numerical quality rating over a predetermined value, generate a plurality of custom investment strategies by selecting securities from the dataset based on the quality ratings and the investment parameters, and provide the plurality of custom investment strategies to the manager device such that the plurality of custom investment strategies are presented within a graphical user interface.

Still another example embodiment relates to a method. The method includes providing, by a provider institution computing system, a plurality of analyst applications to a plurality of analyst computing devices associated with a plurality of analysts, wherein each analyst application is configured to display a plurality of issuer rating fields, receiving, by the provider institution computing system, issuer ratings associated with issuers from the plurality of analyst computing devices, wherein the issuer ratings include qualitative ratings that provide an indication of an analyst's opinion of the issuers, integrating, by the provider institution computing system, the issuer ratings from the plurality of analyst computing devices to generate numerical quality ratings based on the issuer ratings, receiving, by the provider institution computing system, a plurality of investment parameters from a manager device, the plurality of investment parameters defining characteristics of a custom investment strategy, accessing, by the provider institution computing system, a security database including information regarding a plurality of securities issued by the issuers, wherein the security database further includes credit ratings for the plurality of securities, generating, by the provider institution computing system, a dataset based on the credit ratings and the numerical quality ratings, generating, by the provider institution computing system, a custom investment strategy by selecting securities from the dataset based on the quality ratings and the plurality of investment parameters, and providing the custom investment strategy to the manager device.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 6 is a display screen of an analyst device showing a graphical user interface, according to an example embodiment.

FIG. 7 is a display screen of a manager device showing a graphical user interface, according to an example embodiment.

DETAILED DESCRIPTION

Figure 1:
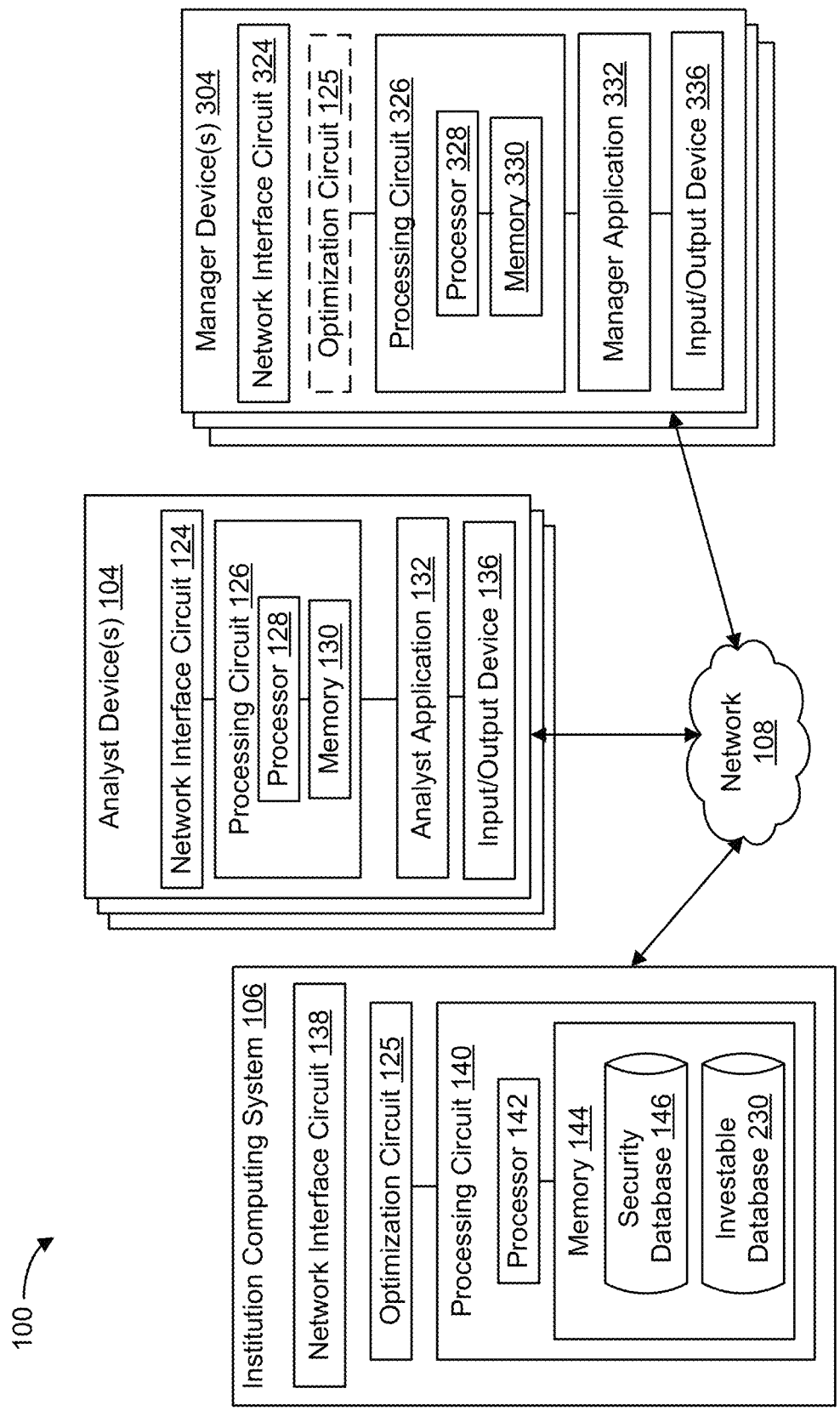
FIG. 1 is a block diagram of a data capture and integration computing system, according to an example embodiment.

Referring generally to the Figures, systems and methods for capturing data associated with multiple analyst devices and integrating the captured data are disclosed according to various embodiments herein. As described herein, a data capture and integration platform receives issuer ratings (e.g., relative value, fundamental recommendation, etc.) for an issuer of a security from one or more analyst devices, generates an issuer quality rating for the issuer based on the received issuer security ratings, and provides the issuer quality rating to the analysts and portfolio managers.

A variety of ways exist to analyze securities (e.g., equity securities, debt securities, derivative securities) and industries. One common approach for analyzing securities, such as a publically traded stock, is using a fundamental analysis. The primary goal of a fundamental analysis (FA) is to identify or determine a true or "fair market" value of the security based on a variety of economic and financial factors (i.e., the fundamentals). For example, a fundamental analysis of a company may consider the company's industry position, growth rate, growth potential, income, revenue, and profit margins to try to determine what the fair market value of the company. A fundamental analysis may also consider qualitative or immeasurable characteristics of the security, such as company culture, morale, leadership quality, etc. to determine the fair market value of the security. The fair market value determined through fundamental analysis is then compared to current offering price of the security to determine if the security is of good value. If the security is undervalued (i.e., the fair market value of the price is greater than the current trading price), an analyst using FA may consider the undervalued security a strong buy. Conversely, if the security is overvalued (i.e., the fair market value of the price is less than the current trading price), an analyst using FA may consider the overvalued FA a strong sell. When comparing one security to another, an analyst performing FA may consider the earnings per share (EPS), price to earnings ratio (P/E), projected earnings growth (PEG), free cash flow (FCF), price to book ratio (P/B), return on equity (ROE), dividend payout ratio (DPR), price to sale ratio (P/S), dividend yield ration, leverage, and/or debt-to-equity ratio (D/E) of each security to determine which security may be a stronger buy. Typically, fundamental analyses are utilized in long-term investment strategies.

Some investment strategies may be focused on investing in bonds (e.g., corporate bonds, municipal bonds, etc.). A bond is a fixed income instrument that represents a loan made by an investor to a borrower (e.g., a corporation or a government). Generally, bonds are sold by a borrower (i.e., the issuer) to an investor (i.e., the bondholder), and the borrower will pay the investor interest payments (i.e., the coupon) in return. The interest payment is part of the return that bondholders earn for loaning their funds to the issuer. The bond includes an interest rate (i.e., the coupon rate), which may be fixed or may vary, that determines the payments. Further, the bond includes a maturity date, which is the time that the originally loaned funds (i.e., the bond principal) must be paid back.

While investing in bonds is generally considered a lower-risk investment, bondholders are still exposed to some risk. For instance, bondholders may be at risk of rising interest rates. For example, if interest rates increase after a bond is purchased and before the maturity date, the bond may be less valuable after the interest rates increase. Further, bondholders may be at risk of issuer default, whereby an issuer may be unable to repay the bond principal. Credit rating services may assess a credit rating (e.g., AAA, AA, A, etc.) for each bond to give an investor an indication of how likely it is that a default may occur. For example, a bond that receives a rating of AAA indicates that it is very likely to be repaid while a BB rating may indicate it is less likely that the bond will be repaid.

Investment teams within a provider institution may have different areas of concentration. For example, one investment team (e.g., a first investment team) may be focused on investing in stocks while a second investment team may be focused on investing in bonds. The first investment team may research (e.g., utilize fundamental analysis) several corporations that are publically traded. The first investment team may then use this research to invest in stocks issued by those corporations. The second investment team may focus on bonds, such as corporate bonds issued by those corporations. Since the first and second investment team are focused on different types of securities (i.e., stocks vs. bonds), research is generally not shared between the investment teams. However, according to the systems and methods described herein, the research performed by the first investment team can be leveraged to generate quality ratings for the corporations. The quality ratings for the corporations may then be utilized by the second investment team to develop a customized investment strategy that includes bonds issued by those corporations.

According to various embodiments, the systems and methods utilized herein may be leveraged to create and manage separately managed accounts (SMAs). A SMA is an investment vehicle composed of stocks, bonds, cash or other individual securities and is typically overseen by a professional money manager (e.g., a portfolio manager). The unique structure of a SMA provides the flexibility to customize the portfolio to address clients' personal preferences and investment objectives. Typically, SMAs are managed by a portfolio manager within the provider institution based on information provided by the account holder to the portfolio manager. For example, a SMA may require a team of analysts (e.g., a first investment team) to perform research for the SMA. Referring to the example above, the second investment team may research issuers (e.g., publically traded corporations) as a part of developing a corporate bond ladder included in a SMA to determine risks associated with bonds issued by the issuers. However, according to the systems and methods utilized herein, by leveraging security research performed by the first investment team within the provider institution, each SMA may not require a team of analysts to perform research on the issuers. For example, the first investment team may have already performed research on the issuers as a part of developing a stock based investment strategy. According to the systems and methods utilized herein, this research may be leveraged as a part of developing a corporate bond ladder thereby reducing the amount of research to be performed and potentially eliminating the need for the second investment team. Thus, the systems and methods utilized herein enable a provider institution to significantly scale the number of SMA accounts at the provider institution without significantly increasing the number of investment teams within the provider institution.

As described herein, a data capture and integration computing system allows issuer ratings from various investment teams to be integrated with security ratings for securities issued by the issuer and provides issuer quality ratings to a PM such that the PM may analyze risks associated with the researched issuer and any securities issued therefrom. Data analysis, in combination with subjective analysis provided by analysts, serves to improve upon existing data capture systems. Once the data is collected, the data is quantified (e.g., a quality rating is generated) such that the investment research and data from the multiple teams may be integrated and a near real time analysis may be provided to a PM that includes the integrated data. The various aspects and embodiments described herein provide a technical improvement in present data capture and integration systems where data from multiple investment teams is analyzed. Accordingly, the technical field may include multiple-source data collection and integration, and the described aspects and embodiments of the systems and methods improve upon existing multiple source data collection systems by at least providing a data capture and integration system configured to collect a wide variety of data from multiple sources, integrate the data from multiple sources, and utilize the integrated information to generate a customized investment strategy.

Technically and beneficially, the systems, methods, and implementations disclosed herein improve the efficiency with which users can analyze research and develop investment strategies. This is accomplished by leveraging research performed by various investment teams throughout a provider institution that would not otherwise be shared between the investment teams. This processes may include combining research from several unrelated investment teams and producing issuer ratings based on the combined research. Combining multiple sources of research enables users (e.g., analysts, portfolio managers, etc.) to simultaneously analyze research performed by multiple investment teams through a single interaction. Thus, by combining multiple sources of research to produce a unique issuer rating, the systems and methods disclosed herein create a novel analysis platform.

Further, the systems and methods disclosed herein improve computing device performance. To illustrate, compare two users who want to generate a customized investment strategy using a computing device. The first user performs these functions using several different databases, while the second does so using the systems and methods disclosed herein. To generate a customized investment strategy, the first user would have to access an issuer database and perform research on the issuers in the database to develop issuer ratings. Next, to generate a customized investment strategy, the first user would need to close the issuer database and access a securities database that includes securities issued by the issuers in the issuer database. Thus, the first user would need to independently research both the issuers and the securities issued by the issuers from at least two databases. Such a process is burdensome on both the user and the computing device. In the previous example, the first user would need to access two different databases and analyze both databases. This requires at least two separate user interactions with the computing device (i.e., one with each database) to develop a customized investment strategy. This number of interactions, in addition to the accessing of two separate databases, puts a burden on the computing device. For example, such a process may use a relatively large portion of the system memory of the mobile device, leading to slower processing speeds and more power consumption. The second user, because the systems and methods disclosed herein are used, however, only needs to access one database (i.e., the securities database) because the system and methods disclosed herein leverage research performed by other investment teams that would otherwise not be shared between the investment teams. Thus, it will take less time to generate a customized investment strategy and access a smaller number of databases. As such, the processor of the computing device is freed up to perform other operations more efficiently. Thus, the systems and methods disclosed herein unexpectedly leads to improved mobile device performance while providing the user access to the same or more functionalities.

Referring now to FIG. 1, a block diagram of a data capture and integration computing system 100 is shown, according to an example embodiment. As will be described in further detail below, the data capture and integration computing system 100 can provide analysts (e.g., analysts, PMs, general managers, etc.) with the ability to receive inputs from various investment teams, quantify the inputs from the various investment teams, integrate the quantified inputs from investment teams, and utilize the integrated information to generate a customized investment strategy. Technically, the present system couples one or more analyst computing devices to combine research performed across multiple investment teams that would otherwise be isolated from one another. In certain embodiments, each analyst's activity (e.g., as a part of the decision making process) may be anonymized. Automated tracking and data analysis in combination with subjective analysis provided by each analyst serves to improve upon existing methods and systems for integrating multiple security analyses. Once the multiple security analyses are integrated, quality scores for various issuers may be generated based on the integrated information. Thus, the various aspects and embodiments described herein provide a technical improvement in analyst data collection and integration by uniquely integrating data from various sources. In operation, the present system tracks issuer ratings from various investment teams and leverages the insight gained from the multiple investment teams to generate customized investment strategies. As used herein, the phrase custom or customized investment strategy refers to a defined approach to investing assets, including a set of rules. According to various embodiment, the customized investment strategy includes a list of security related trades, which may be executable (e.g., by the trade/order management system 236 discussed below).

As shown, the data capture and integration computing system 100 includes one or more analyst devices 104, one or more manager devices 304, and a provider institution computing system 106. The one or more analyst devices 104, the one or more manager devices 304, and the provider institution computing system 106 are shown to be communicatively and operatively coupled to each other via a network 108. The network 108 provides communicable coupling between and among the one or more analyst devices 104, the one or more manager devices 304, the provider institution computing system 106, and/or other components disclosed and described herein to provide and facilitate the exchange of communications (e.g., data, instructions, messages, values, commands, etc.). The network 108 may include one or more of a local area network, a wide area, a wired network, and/or a combination of wireless and wired networks. Examples of network configurations include the Internet, a cellular network, Wi-Fi, Wi-Max, a proprietary banking network, etc. In some embodiments, the network 108 includes a proprietary banking network to provide secure or substantially secure communications.

The analyst device(s) 104 is a computing device associated with an analyst. For example, analyst devices 104 may be operated by analysts (e.g., a first analyst, a second analyst, etc.) on various investment teams (e.g., a first investment team, a second investment team, etc.) within the provider institution. For example, the provider institution may be an investment institution such as investment banking firms, private equity funds, hedge funds, etc. In certain embodiments, the first investment team and the second investment team are isolated from one another. That is, except as described otherwise herein, the first and second investment teams are not in direct communication with each other, do not directly share research with one another, and do not work together to develop investment plans.

The analyst device(s) 104 can be any type of computing device that may be used to access, research, develop and/or modify information related to various securities. In this regard, the analyst device(s) 104 may include any wearable or non-wearable computing device. Wearable computing devices refer to any type of device that an individual wears including, but not limited to, a watch (e.g., a smart watch), glasses (e.g., eyeglasses, sunglasses, smart glasses, etc.), bracelet (e.g., a smart bracelet), etc. The analyst device(s) 104 and the second investment team analyst device(s) 204 may also include any type of computing device including, but not limited to, a phone (e.g., smart phone), a tablet, a laptop, a desktop computer, a personal digital assistant, etc. The analyst device) 104 may be the same computing devices (e.g., both analyst devices 104 are a tablet. Alternatively, the analyst device 104 may be different computing devices (e.g., the first analyst device 104 is a phone and the second analyst device 104 is a laptop).

As shown in FIG. 1, the analyst devices 104 includes a network interface circuit 124 configured to enable the analyst device(s) 104 to exchange information over the network 108, a processing circuit 126, and an input/output (I/O) device 136. The network interface circuit 124 can include program logic that facilitates connection of the analyst device(s) 104 to the network 108. The network interface circuit 124 can support communications between the analyst device(s) 104 and other systems, such as the provider institution computing system 106. For example, the network interface circuit 124 can include a cellular modem, a Bluetooth transceiver, a radio-frequency identification (RFID) transceiver, and a near-field communication (NFC) transmitter. In some embodiments, the network interface circuit 124 includes the hardware and machine-readable media sufficient to support communication over multiple channels of data communication. Further, in some embodiments, the network interface circuit 124 includes cryptography capabilities to establish a secure or relatively secure communication session between the analyst device(s) 104 and the provider institution computing system 106. In this regard, information (e.g., security ratings, recommended buys, risk assessments, etc.) may be encrypted and transmitted to prevent or substantially prevent a threat of hacking.

The processing circuit 126 is shown to include a processor 128 and a memory 130. The processor 128 may be implemented as one or more application specific integrated circuits (ASICs), field programmable gate arrays (FPGAs), a group of processing components, or other suitable electronic processing components. The memory 130 may be one or more devices (e.g., RAM, ROM, Flash memory, hard disk storage) for storing data and/or computer code for completing and/or facilitating the various processes described herein. The memory 130 may be or include non-transient volatile memory, non-volatile memory, and non-transitory computer storage media. The memory 130 may include database components, object code components, script components, or any other type of information structure for supporting the various activities and information structures described herein. The memory 130 may be communicably coupled to the processor 128 and include computer code or instructions for executing one or more processes described herein.

The analyst device 104 may include an analyst application 132. In the example shown, the analyst application 132 may be provided and supported by the provider institution. In some embodiments, the analyst application 132 is configured to generate and provide displays for presentation/display by the analyst device 104 (e.g., to the I/O device 136 described below) that enable the analyst to view and/or manage security related data received from the provider institution computing system 106 and, in particular, utilize the data capture and integration system 100. For example, the analyst application 132 may include/generate a graphical user interface (GUI) that enables the analyst to interact with the analyst application 132 on the analyst device as is discussed further below. Accordingly, the analyst application 132 is configured to send information (e.g., security ratings) to, and receive information from, the provider institution computing system 106.

The analyst application 132 may be implemented as an application that includes one or more plug-ins (e.g., analyst tracking software configured as a web browser plug-in) on the analyst device 104. The analyst application 132 may be downloaded by the analyst device 104 prior to its usage, hard coded into the memory 130 of the analyst device 104, or be a network-based or web-based interface application such that the analyst device 104 may provide a web browser to access the application, which may be executed remotely from the analyst device 104.

Accordingly, the analyst device 104 may include software and/or hardware capable of implementing a network-based or web-based application. For example, in some instances, the analyst application 132 includes software such as HTML, XML, WML, SGML, PUP (Hypertext Preprocessor), CGI, and like languages.

In some embodiments, the analyst interacts with the analyst application 132 via an I/O device 136. The I/O device 136 can include hardware and associated logics that enable the analyst to exchange information with the analyst device 104. An input component of the I/O device 136 can allow the analyst to provide information to the analyst device 104. The input component may include various hardware and associated logics such as, for example, a mechanical keyboard, a mechanical mouse, a touchscreen, a microphone, a camera, a fingerprint scanner, etc. Likewise, an output component of I/O device 136 can include hardware and associated logics that allow the analyst device 104 to provide information to the analyst. For example, the output component may include a digital or touchscreen display, a speaker, illuminating icons, LEDs, etc. In this way, the analyst can interact with the analyst application 132. For example, the analyst may provide login information (e.g., analyst name, password, etc.) by typing on a mechanical keyboard or touchscreen keyboard included in the I/O device 136 and be provided account information on a digital display component of the I/O device 136.

As shown in FIG. 1, the data capture and integration computing system 100 also includes one or more manager devices 304. Each manager device 304 is configured to receive information from the analyst device 104 and/or the provider institution computing system 106. Each manager device 304 may be operated by a portfolio manager or another designated operator. For example, the manager device 304 may be operated by a portfolio manager that manages a group of analysts operating the analyst devices 104. In this example, the manager device 304 may receive investment recommendations from the analyst devices 104 via the network 108. Alternatively, the portfolio manager may be completely isolated (e.g., on a different investment team) from the first group of analysts and/or the second group of analysts. In this example, investment recommendations may be provided by the analyst device 104 to the provider institution computing system 106 via the network. The provider institution computing system 106 may then provide the information related to the investment recommendations to the manager device 304 via the network 108.

According to one embodiment, the manager device 304 may be operated by an account holder of the provider institution. For example, an individual with a separately managed account (SMA) with the provider institution may operate the manager device 304. Thus, the manager device 304 need not be operated by a portfolio manager, and instead may be operated by customer of the provider institution. In this example, the individual may use the manager device 304 to submit investment parameters to the provider institution computing system 106 as a part of developing a customized investment strategy. The investment parameters define the characteristics of the investment strategy. For example, the account holder may use the manager device 304 to submit investment parameters (e.g., a low risk, corporate bond, customized ladder with annual coupon payments) as a part of designing a customized investment strategy. Typically, SMAs are managed by a portfolio manager within the provider institution based on information provided by the account holder to the portfolio manager. In operation, a SMA may require a team of analysts to perform research for the SMA. However, by leveraging security research performed by analysts within the provider institution, each SMA may not require a portfolio manager, but instead may be managed by an account holder with the provider institution.

The manager device 304 may be similar or the same as the analyst device 104. For example, the manager device 304 includes a network interface circuit 324 configured to enable the manager device 304 to exchange information over the network 108. In one embodiment, the manager device 304 includes an optimization circuit 125. The optimization circuit 125 is configured to optimize a customized investment strategy as described further below. For example, the optimization circuit 125 may optimize the customized investment strategy based on the generated quality ratings, the investment parameters, and systematic tax loss harvesting.

The manager device 304 is shown to include a processing circuit 326 that includes a processor 328 and a memory 330. The processing circuit 326 may be the same or similar to the processing circuit 126. Further, the processor 328 and the memory 330 may be similar to the processor 128 and the memory 130, respectively. The manager device(s) 304 may include an I/O device 336 that is similar to the I/O device 136. Thus, different reference numbers are used with the manager device(s) 304 for clarity, but it should be appreciated that the manager device 304 may have the same or similar structure as the analyst device 104. In other embodiments, the structure of the manager device 304 may differ from the analyst devices 104.

The manager device 304 includes a manager application 332. When the optimization circuit 125 is included with the manager device 304, the circuit 125 may include the manager application 332. That way, the operations described herein with respect to the optimization circuit 125 can be readily provided via the manager application 332. In another embodiment, the manager application 332 is coupled to the provider institution computing system (and, for example, the optimization circuit 125 when the optimization circuit 125 is disposed in the institution computing system).

The manager application 332 may be configured to receive investment related information from the analyst devices 104 and the provider institution computing system 106. The manager application 332 may be provided and supported by the provider institution. The manager application 332 is configured to receive data associated with the analyst applications 132 and receive integrated data from the provider institution computing system 106. In some embodiments, the manager application 332 is configured to generate and provide displays for presentation/display by the manager device 304 (e.g., to the I/O device 136 described above) that enable the manager to view and/or manage integrated data received from the provider institution computing system 106 and, in particular, utilize the data capture and integration system 100. For example, the manager application 332 may include a graphical user interface (GUI) that enables the manager to interact with the manager application 332 on the manager device 304 as is discussed further below with respect to FIG. 7. Accordingly, the manager application 332 is configured to send information to, and receive information from the provider institution computing system 106.

As shown in FIG. 1, the data capture and integration computing system 100 includes a provider institution computing system 106. As depicted, the provider institution computing system 106 is a backend computer system that supports the analyst device 104, the manager device 304, and other services offered by the provider institution. The provider institution computing system 106 is configured to receive data (e.g., security ratings) from the analyst devices 104, analyze the tracking information and feedback, and provide data (e.g., security ratings, investment strategies, etc.) to the analyst devices 104 and the manager device 304 based on the tracking information and feedback received. The provider institution computing system 106 is associated with a provider institution. The provider institution may be a financial institution such as an investment banking firm, private equity fund, hedge fund, bank, credit union, credit card company, asset manager, and so on. The provider institution computing system 106 includes a network interface circuit 138 and a processing circuit 140. The network interface circuit 138 includes program logic that facilitates connection of the provider institution computing system 106 to other components of the data capture and integration computing system 100 over the network 108.

As shown, the institution computing system 106 includes the optimization circuit 125. The optimization circuit 125 is configured to optimize a customized investment strategy as described further below. For example, the optimization circuit 125 may optimize the customized investment strategy based on the generated quality ratings, the investment parameters, and systematic tax loss harvesting.

The processing circuit 140 includes a processor 142 and a memory 144. As shown in FIG. 1, the memory 144 includes a security database 146. In other embodiments, the security database 146 may be separate from the memory. The security database 146 is configured to retrievably store data relating to securities, such as issuer ratings received from the analyst devices 104 or other sources. In this regard, the security database 146 is configured to store data associated with each analyst device 104. The provider institution computing system 106 may further transform the issuer ratings stored in the security database 146. For example, the provider institution computing system may transform and combine the qualitative issuer ratings into a quantitative quality ratings score, as is described further below with respect to FIG. 4. For example, the provider institution computing system 106 may receive information from a plurality of analyst devices (e.g., the analyst device 104), analyze the data received, integrate the data, and provide the integrated data to the manager device 304. The security ratings stored therein may be generated internally (e.g., at the provider institution computing system 106) or by other entities (e.g., at the analyst devices 104). Alternatively, or additionally, the processing circuit 140 may provide the integrated data to an analyst device (e.g., the analyst devices 104) such that the analyst device 104 may store the analyst information in an analyst application 132 and each manager device 304 may store the analyst information in the manager application 332 maintained internally within the device.

According to various embodiments, the memory 144 further includes an investable database. The investable database 230 is configured to store a list of highly rated securities, which may be determined based on risk indices received from various vendors (e.g., the vendors 220 discussed below), issuer ratings submitted by the analyst devices 104, and quality ratings generated by the provider institution computing system 106, as is discussed further herein. The investable database 230 may be the same or similar to the security database 146. The investable database 230 may be configured to store a list of issuers and securities issued by those issuers. For example, the list of issuers and securities may be generated based on a list of issuers received from vendors, the investment parameters received from a manager device 304, the quality ratings generated by the institution computing system 106, and any other information described herein.

The network interface circuit 138 includes program logic that facilitates connection of the provider institution computing system 106 to the network 108. The network interface circuit 138 can support communication between the other systems, such as the analyst devices 104 and the manager devices 304. For example, the network interface circuit 138 can include a cellular modem, a Bluetooth transceiver, a radio-frequency identification (RFID) transceiver, and a near-field communication (NFC) transmitter. In some embodiments, the network interface circuit 138 includes the hardware and machine-readable media sufficient to support communication over multiple channels of data communication. Further, in some embodiments, the network interface circuit 138 includes cryptography capabilities to establish a secure or relatively secure communication session between other systems such as the analyst device(s) 104, the second investment team analyst device(s) 204, and the manager device(s) 304. In this regard, information (e.g., account information, login information, financial data, and/or other types of data) may be encrypted and transmitted to prevent or substantially prevent a threat of hacking.

The processor 142 may be implemented as one or more application-specific integrated circuits (ASICs), field-programmable gate arrays (FPGAs), a group of processing components, or other suitable electronic processing components. The memory 144 may be one or more devices (e.g., RAM, ROM, Flash memory, hard disk storage) for storing data and/or computer code for completing and/or facilitating the various processes described herein. The memory 144 may be or include non-transient volatile memory, non-volatile memory, and non-transitory computer storage media. The memory 144 may include database components, object code components, script components, or any other type of information structure for supporting the various activities and information structures described herein. The memory 144 may be communicably coupled to the processor 142 and include computer code or instructions for executing one or more processes described herein. In some embodiments, the provider institution computing system 106 is a distributed computing system and includes one or more servers. In this case, provider institution computing system 106 may include multiple network interface circuits 138 and/or multiple processing circuits 140.

As depicted, the provider institution computing system 106 is a backend computer system. The provider institution computing system 106 may be implemented using a computing system, such as a discrete server, a group of two or more computing devices/servers, a distributed computing network, a cloud computing network, and/or another type of computing system capable of accessing and communicating using local and/or global networks (e.g., the network 108).

Figure 2:
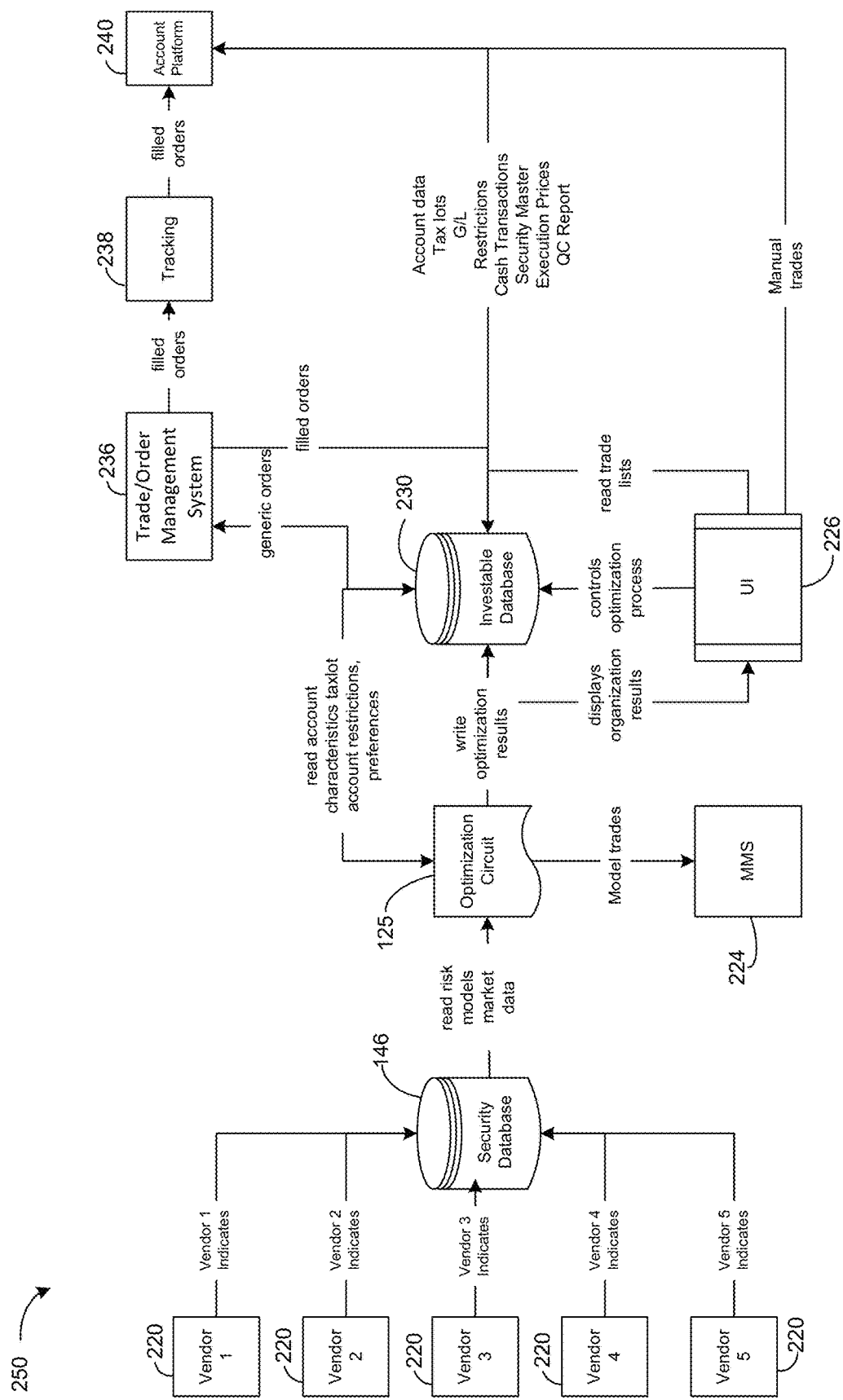
FIG. 2 is a schematic of a customized investment strategy workflow, according to an example embodiment

Referring now to FIG. 2, a schematic of a customized investment strategy workflow 250 is shown according to an example embodiment. It should be appreciated that the workflow need not be performed in the order displayed in FIG. 2. Further, various components of the customized investment strategy workflow 250 may be omitted and additional components may be added to the processes shown in FIG. 3. The customized investment strategy workflow 250 may be implemented using, for example, the data capture and integration system 100. Accordingly, reference is made to the data capture and integration computing system 100 to aid explanation of the customized investment strategy process 200.

The customized investment strategy workflow 250 includes a plurality of vendors 220 (e.g., Bloomberg, MSCI, FactSet, JPM, etc.). The vendors 220 (and, particularly, vendor computing systems) may provide investment information (e.g., via the network), such as a list of issuers and any associated risk indices associated with those issuers. According to various embodiments, the list of issuers provided from each vendor 220 is a filtered list that includes only highly rated issuers, as determined by the vendors 200. This list of highly rated issuers may then be stored in the security database 146, such that the list of issuers may be accessed by the analyst devices 104 and the manager devices 304. Further, the security database 146 may be accessed by the optimization circuit 125, such that the optimization circuit may generate a customized investment strategy that includes securities issued by issuers identified in the security database.

The customized investment strategy workflow 250 includes a user interface 226. In one embodiment, the user interface 226 may be a part of the analyst application 132 and the manager application 332. For example, the user interface 226 may be utilized to submit investment parameters and issuer ratings. The investment parameters define the desired characteristics of a customized investment strategy, as is discussed further below. The issuer ratings are an analyst's subjective opinion of an issuer of a security, as is discussed further below. The investment parameters and issuer ratings may be stored in the investable database, such that the optimization circuit 125 may access the investment parameters and issuer ratings to generate a customized investment strategy. Further, the user interface 226 may be used to view the investable database and any customized investment strategies that may be generated. Further, the user interface 226 may be used to submit manual trades (i.e., trades that have not been determined by the optimization circuit 125).

The optimization circuit may modify the investable database 230 based on the investment parameters and the issuer ratings received from the user interface 226. For example, as is discussed further below, the optimization circuit may update the investable database 230 to only include securities issued by high quality issuers. The quality ratings are a score generated based on the issuer ratings that provides an indication of the relative financial strength of each issuer. The list of high quality issuers may be determined based on the vendor indices and the issuer ratings. The optimization circuit 125 may then optimize a customized investment strategy to include only securities issued by the high quality issuers. For example, the optimization circuit 125 may generate every, or nearly every, possible customized investment strategy that complies with the investment parameters and store the possible customized investment strategies the investable database. The optimization circuit 125 may then select one or more customized to a trade/order management system 236. The trade/order management system 236 may perform the necessary trades to complete the customize investment strategies. Records of the performed trades may then be sent back to the investable database 230 for storage. Records of the performed trades may further be provided to a tracking circuit 238. The tracking circuit 238 may track the performance of the securities related to the customized investment strategy. Further, records of the performed trades may be provided to an account platform 240. The account platform may be accessed by the user interface 226 such that a user may monitor and modify the customized investment strategy.

Further, the customized investment strategy may be provided to a Model Management System (MMS) circuit 224. The MMS circuit 224 is configured to confirm that that the proposed trades included in the customized investment strategy comply with the relevant rules and regulations. For example, the MMS circuit 224 may confirm that the tax loss harvesting complies with all relevant regulations. MMS also serves as a central repository of all models providing record keeping and auditing capabilities.

Each of the MMS circuit 224, trade/order management system 236, tracking circuit 238, and account platform 240 may be included with the institution computing system 106. Beneficially, these circuits are coupled to the optimization circuit 125 to enable rapid processing of various information to enable various processes described herein in a quick and efficient manner.

Figure 3:
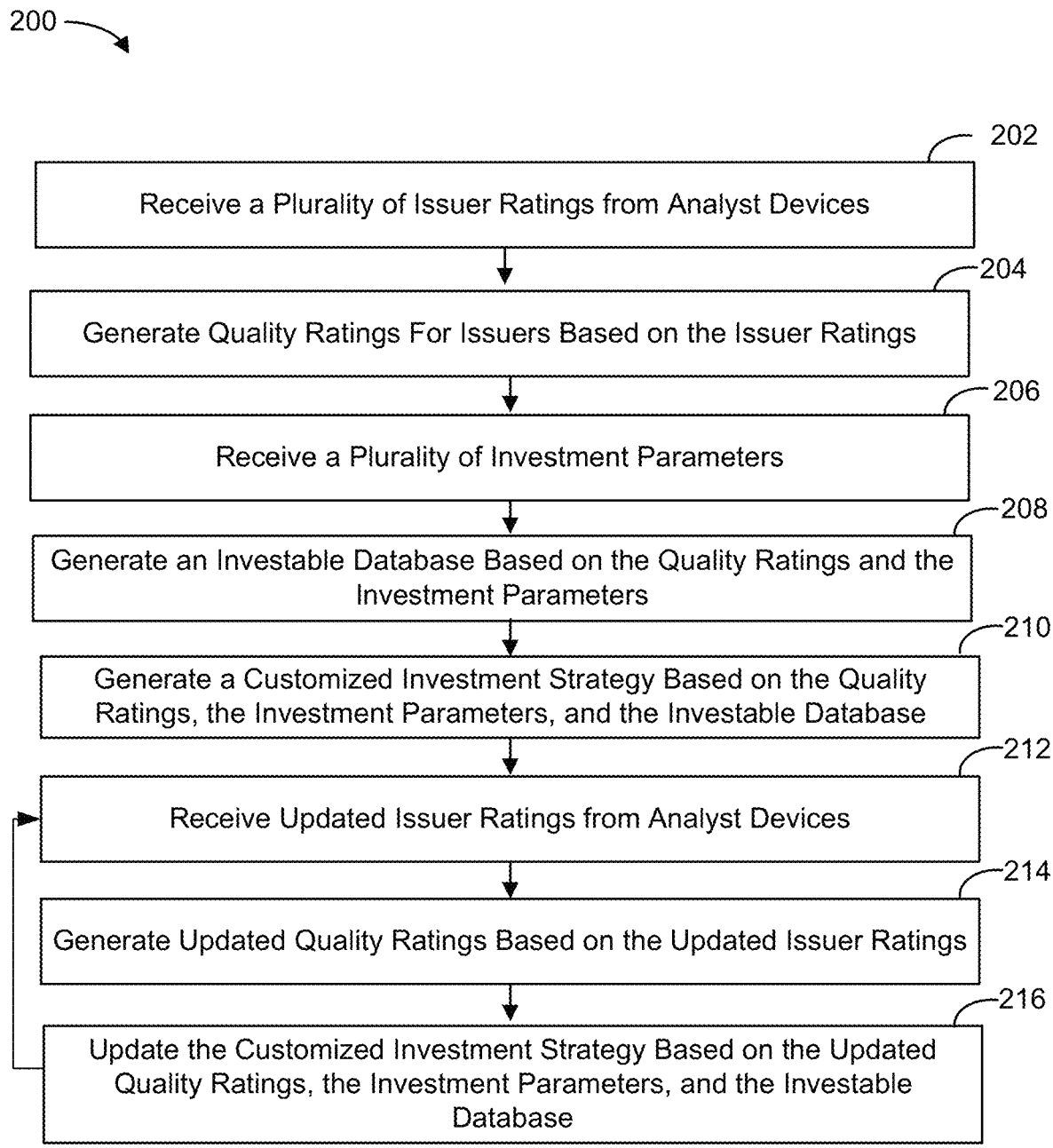
FIG. 3 is a flow diagram of a customized investment strategy process, according to an example embodiment

Referring now to FIG. 3, a flow diagram of a customized investment strategy process 200 according to an example embodiment. It should be appreciated that the processes need not be performed in the order displayed in FIG. 3. Further, certain processes may be omitted and additional processes may be performed in addition to the processes shown in FIG. 3. The customized investment strategy process 200 may be implemented using, for example, the data capture and integration system 100. Accordingly, reference is made to the data capture and integration computing system 100 to aid explanation of the customized investment strategy process 200.

At process 204, a plurality of issuer ratings are received from the analyst devices 104. The issuer ratings refer to an analyst's subjective opinion of an issuer of a security (e.g., a publically traded corporation). For example, the issuer ratings may be received by the provider institution computing system 106 from the analyst application 132 of the first analyst device 104. For example, the issuer may be a corporation and the security may be a corporate bond offered by that corporation. In this example embodiment, the issuer rating is the analyst's rating of the corporation and not necessarily the bond or other security offered by the corporation. Thus, the analyst may be a member of an investment team (e.g., a fundamental investment team) that is focused on publically traded stocks and the issuer may be a publically traded stock that the analyst is assessing.

The issuer ratings may include an industry rating (e.g., an opinion on the relative strength of the industry the corporation is involved in as compared to other industries), a profitability rating, a valuation rating, a growth rating, a health rating, and a dividend rating. Further, the issuer ratings may include an analyst's qualitative opinions of the issuer.

The analyst may utilize the analyst application 132 to submit a relative value recommendation as a part of the issuer rating. The relative value recommendation is an analyst's subjective opinion of a relative value assessment of an issuer with respect to a group of issuers (e.g., issuers within a certain industry). In certain other embodiments, this relative value of the issuer may be determined with respect to the US Credit A or Better Index. In certain embodiments, if the relative value assessment with respect to US Credit A or Better Index is not available, than the relative value assessment with respect to US Credit Index may be used. For example, the analyst may interact with the GUI of the analyst application 132 to select a relative value recommendation. In certain embodiments, a finite number of options may be presented within the analyst application 132 such that the analyst may select a relative value recommendations. For example, there may be five available value recommendations displayed within the analyst application 132 (e.g., within a drop down menu), such as "significantly overweight" (i.e., the highest relative value recommendation), "overweight," "stable," "underweight," and "significantly underweight" (i.e., the lowest relative value recommendation).

Additionally, the issuer ratings may include a fundamental recommendation. The fundamental recommendation is an analyst's opinion of the issuer's fundamentals. For example, the fundamental recommendation may be based on assessment of an issuer's fundamentals. In certain embodiments, a finite number of options may be presented within the analyst application 132 such that the analyst may select a fundamental recommendation. For example, there may be five available value recommendations displayed within the analyst application 132 (e.g., within a drop down menu), such as "significantly improving" (i.e., the highest fundamental recommendation), "improving," "stable," "deteriorating," and "significantly deteriorating" (i.e., the lowest fundamental recommendation).

In certain embodiments, process 202 may include receiving issuer ratings from a plurality of analyst devices 104.

The plurality of analyst devices 104 may each be associated with an analyst on an investment team. For example, each member of the fundamental analysis team may operate his or her own analyst device 104. Therefore, in this example, process 202 may include receiving issuer ratings from each of the plurality of analyst devices 104.

At process 204, quality ratings are generated for the plurality of issuers. The quality ratings refer to quantitative scores or values that provide an indication of the risk associated with investing in a security issued by the issuer. The quality ratings may be generated by the provider institution computing system 106. For example, quality ratings may be generated for some or all of the issuers that issuer ratings were received for at process 202. For instance, a quality rating may be generated for a corporation that offers corporate bonds. The quality rating may then be used to assess the risk of purchasing the corporate bond from the corporation. While corporate bonds are generally assigned credit ratings, assigning a quality rating to the corporation (i.e., the issuer), rather than the corporate bond itself, may provide further insight into the risks associated with the bond. As an example, a relatively high quality rating for an issuer may indicate that the issuer has relatively strong underlying fundamentals, and, therefore, it is unlikely that the issuer will default on any securities issued by the issuer.

The quality rating may be generated using the received issuer ratings. For example, the quality rating may be generated based at least in part by utilizing the relative value recommendations and the fundamental recommendations received from the analyst devices 104. For example, the quality rating may be generated using a quality rating matrix, such as the quality rating matrix shown in FIG. 4, which is discussed in more detail below. The quality rating may be a numerical score (e.g., on a scale from 1 to 9 or a different scale) and assigned to the issuer. In this sense, generating the quality rating converts issuer ratings (e.g., overweight, stable, etc.) into a quantitative score, such that the issuer ratings may be easily analyzed and combined with other security related data.

According to various embodiments, the issuer ratings may be received from investment teams focused on stocks (i.e., the issuers) rather than the other securities issued by those entities (e.g., corporate bonds). However, the quality rating may be used by investment teams focused on the issued securities (e.g., corporate bonds). Thus, the customized investment strategy process 200 leverages research performed by various investment teams that are otherwise generally isolated from one another to generate quality ratings for issuers.

At process 206, a plurality of investment parameters are received from the manager device 304. The investment parameters are selected by a manager (e.g., portfolio manager, account holder, etc.) and define the desired characteristics of a customized investment strategy. For example, the investment parameters may define the type of investment strategy (e.g., a bond ladder), the type of securities to be included (e.g., corporate bonds, municipal bonds, stocks, ETFs, etc.), a duration of the investment strategy (e.g., 25 years), the number of securities to be included (e.g., between 5 and 15), ratings of the securities (e.g., investment grade only, A credit rating or better, etc.), a minimum and maximum amount of time to hold each security (e.g., bonds with a maturity date between 0.5 and 15 years form the present date), characteristics of the issuer (e.g., market value must be greater than $2 billion, liquidity score over 75, etc.), issue tradability characteristics (e.g., a minimum tradable amount, a minimum holding, etc.), a relative risk level (e.g., high, medium, low), a minimum quality rating of the issuer, desired cash withdrawals (e.g., annual coupon payments), desired tax harvesting characteristics, and/or any other characteristics of the investment strategy. According to various embodiments, the liquidity score is based on a bond's LQA score (liquidity score) provided by the index provider. The LQA score is measured on a scale of 1 to 100 (100 being the most liquid) that summarizes the relative liquidity of an instrument in the investable database, which is described in further detail below. Liquidity in this sense is the ability to sell a security at the lowest cost for a comparable range of volumes. According to an example embodiment, a graphical user interface (GUI) may be presented within the manager application 332 of the manager device 304. The operator of the manager device 304 (e.g., an account holder, the portfolio manager, etc.) may then submit desired investment parameters to the provider institution computing system 106 such that the investment parameters may be used to generate a customized investment strategy.

At process 208, an investable database is generated. The investable database or dataset is a set of security related data that may be accessed by various computing devices. The investable database includes a list of securities that include the characteristics indicated by the investment parameters. Further, the investable database may be filtered based on the quality ratings generated for each issuer. For example, the investable database may be generated by the provider institution computing system 106. For example, a user of the manager device 304 may submit investment parameters to create a relatively low risk bond ladder, wherein the investment parameters require a corporate bonds, having a minimum "A" credit rating, and a high quality rating (e.g., 1-4 out of 9, wherein 1 is the highest possible quality rating). In this embodiment, the provider institution computing system 106 may access a database of all available corporate bonds (e.g., all publicly traded fixed income securities in the Bloomberg Barclay's Corporate Index and the Bloomberg Barclays Short Corporate Index) and add any corporate bonds that meet the requirements defined by the investment parameters to the investable database (i.e., create this specific dataset). In another example embodiment, the investable database is generated based on the quality ratings of issuers and the credit ratings of the securities issued by the issuers. For example, the investable universe may include bonds with a minimum "A" credit rating that were issued by corporations with a high quality score.

At process 210, a customized investment strategy is generated. The customized investment strategy generated is a personalized investment plan in compliance with the investment parameters. For example, the customized investment strategy may be generated by the provider institution computing system 106. The customized investment strategy may be generated based at least in part on the investment parameters. For example, one of the investment parameters may require a corporate bond ladder to be generated. Further investment parameters may require the corporate bond ladder to harvest tax loses, concentrate on bonds issued from US corporations, require bonds to have a minimum "A" credit rating, and receive annual cash coupon payments from the corporate bond ladder.

Process 210 may also include optimizing the customized investment strategy. Optimizing the customized investment strategy includes generating an investment plan that maximizes return and minimizes risk based on the investment parameters. Optimizing the customized investment strategy may also include generating an investment plan that targets other objective functions like minimizing the tracking error to the benchmark, minimizing the tax liability, etc. For example, the optimization circuit 125 may generate some or all possible investment strategies by selecting securities from the investable database that meet the characteristics defined by the investment parameters. The optimization circuit 125 may then analyze the possible investment strategies and project the performance and the risk associated with each investment strategy based at least in part on the quality ratings generated at process 204. According to various embodiments, the customized bond ladder is optimized based at least in part on risk, tax loss harvesting, coupon payments, and wash sale avoidance. For example, using artificial intelligence, machine learning, fuzzy logic, and/or other processes, the optimization may be performed for various given constraints (tax regulations, etc.).

According to various example embodiments, the customized investment plan is optimized for systematic tax loss harvesting. Incorporating tax loss harvesting systematically into the portfolio optimization process provides an effective way to reduce overall tax liability for the investor and boost after-tax returns. For example, the provider institution computing system 106 may monitor the customized investment strategy over the life of the customized investment strategy to determine if and when tax losses may be harvested in a beneficial matter. Further, the customized investment strategy may be optimized to actively manage tax liability. Because a customized investment strategy may have varying tax liability management goals, the optimization process provides a framework for managing the tax liabilities of an individual account holder. For example, the operator of the manager device can specify upper and lower boundaries (e.g., as investment parameters) for net realized capital gains (either short-term or long-term) or overall tax liability for a given calendar year. This also provides the investors the flexibility to defer tax realization to the future. According to various embodiments, the customized investment strategy is optimized to manage cash withdrawals. For example, the customized investment strategy may utilize coupon payments to provide cash payments to the account holder in a tax-efficient way while controlling the portfolio's risk relative to the target benchmark.

At process 212, updated issuer ratings are received from the analyst devices 104. For example, the provider institution computing system 106 may receive updated issuer ratings from the analyst devices 104. For example, the analysts operating the analyst devices 104 may perform regular research (e.g., hourly, daily, weekly, etc.). While performing security research, the analysts may utilize the analyst applications 132 to submit issuer ratings to the provider institution computing system 106.

At process 214, updated quality ratings are generated. For example, the provider institution computing system 106 may generate undated quality rating for issuers based on the updated issuer ratings received at process 212. The updated quality ratings may be calculated in a same or similar manner as process 204.

According to various embodiments, process 214 may include generating notifications in response to an updated quality rating having changed (i.e., a difference between the previous quality rating and the updated quality ratings) or significantly changed (e.g., changed more than a predefined percentage or amount relative to a threshold value). For example, if a quality rating for an issuer changes from a high rating (e.g., 3 out of 9, wherein 1 is the highest quality) to a low rating (e.g., 7 out of 9), a notification may be provided to the manager devices 304 (i.e., based on the difference exceeding a threshold value of, e.g., 3). In various embodiments, the notification may only be provided to manager devices 304 operated by individuals involved in a customized investment strategy that has an interest in a security issued by the issuer. In various embodiments, the notification may be displayed in the manager application 332. Further, the notification may identify some or all of the analysts (e.g., via an analyst identifier included in the notification) that submitted updated issuer ratings for the issuer. Furthermore, the operator of the of the manager device 304 may be able to select one or more of the analyst identifiers in the manager application 332 and a method of communication may be initiated between the manager device 304 and the respective analyst device 104 (e.g., launch an instant message, launch a chat box within the analyst application 132 and the manager application 332, generate an email, initiate a phone call, etc.).

At process 216, the customized investment strategy is updated. For example, the provider institution computing system 106 may update the customized investment strategy based on the updated quality ratings. Further, the provider institution computing system 106 may receive updated investment parameters at any point during the customized investment strategy process 200 and the customized investment strategy may be further updated based on the updated investment parameters. Further, process 216 may include updating the investable database based on the updated issuer ratings. For example, a new investable database may be generated in a similar manner as process 208. Further, the customized investment strategy may be optimized based on the updated investment parameters and the updated quality ratings in a same or similar manner as the investment strategy is optimized as a part of process 208.

After process 216 is completed, the customized investment strategy process 200 may return to process 212. For example, each time updated issuer ratings are received from the analyst devices 104, updated quality ratings may be generated, and the customized investment strategy may be updated. In this example, the customized investment strategy process 200 provides a real time or near real time risk assessment for securities within the investable database.

Figure 4:
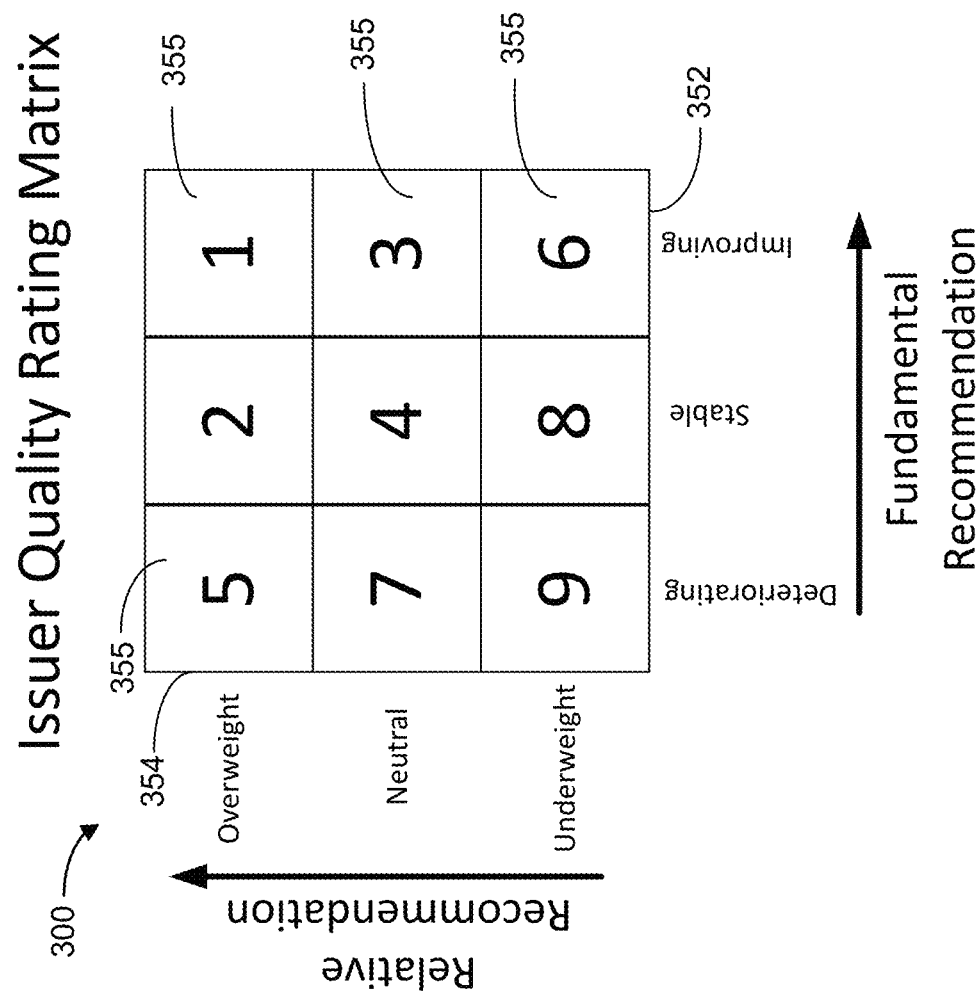
FIG. 4 is a schematic view of an issuer quality rating matrix, according to an example embodiment.

Referring now to FIG. 4, an issuer quality rating matrix 300 is shown according to an example embodiment. The issuer quality rating matrix 300 may be used to integrate and quantify two or more qualitative issuer ratings. As shown, the issuer quality rating matrix 300 is used to integrate a relative recommendation and a fundamental recommendation (e.g., that are received from an analyst device 104) and generate a numerical issuer quality rating score. The matrix 300 may be provided as a graphical user interface from the analyst and/or manager applications and/or via a web-application provided by the provider institution computing system. The issuer quality rating matrix 300 may be used, for example, by the provider institution computing system 106 to integrate qualitative issuer ratings into a quantitative score, such as the quality rating generated as a part of the customized investment strategy process 200. The issuer quality rating matrix 300 may be accessed and utilized by the provider institution computing system 106, the analyst devices 104, and the manager devices 304. As shown, the issuer quality rating matrix 300 includes a first axis 352 corresponding with a first issuer rating (e.g., fundamental recommendation) and a second axis 354 corresponding with a second issuer rating (e.g., relative recommendation). Thus, in the shown embodiment, relative recommendations and fundamental recommendations received may be combined and converted into quality ratings for an issuer. In this example embodiment, the highest quality rating is 1, which corresponds to an issuer that is rated as overweight and improving, and the lowest quality rating is 9, which corresponds to an issuer that is rated as underweight and deteriorating. Thus, the example embodiment shown includes nine different issuer quality rating buckets 355 that are used to categorize the issuers.

However, in various embodiments, the issuer quality rating matrix may include less than 9 quality rating buckets 355 or more than 9 quality rating buckets 355. For example, there may be five available value recommendations displayed within the analyst application 132 (e.g., within a drop down menu), such as "significantly overweight" (i.e., the highest relative value recommendation), "overweight," "stable," "underweight," and "significantly underweight" (i.e., the lowest relative value recommendation), and there may be five available value recommendations displayed within the analyst application 132 (e.g., within a drop down menu), such as "significantly improving" (i.e., the highest fundamental recommendation), "improving," "stable," "deteriorating," and "significantly deteriorating" (i.e., the lowest fundamental recommendation). This would result in an issuer quality matrix having 25 quality rating buckets 355. In further embodiments, one or more additional axis may be added to the issuer quality rating matrix 300. For example, a third qualitative issuer rating may be added to the issuer quality rating matrix, thereby creating a 3 dimensional issuer quality rating matrix.

Figure 5:
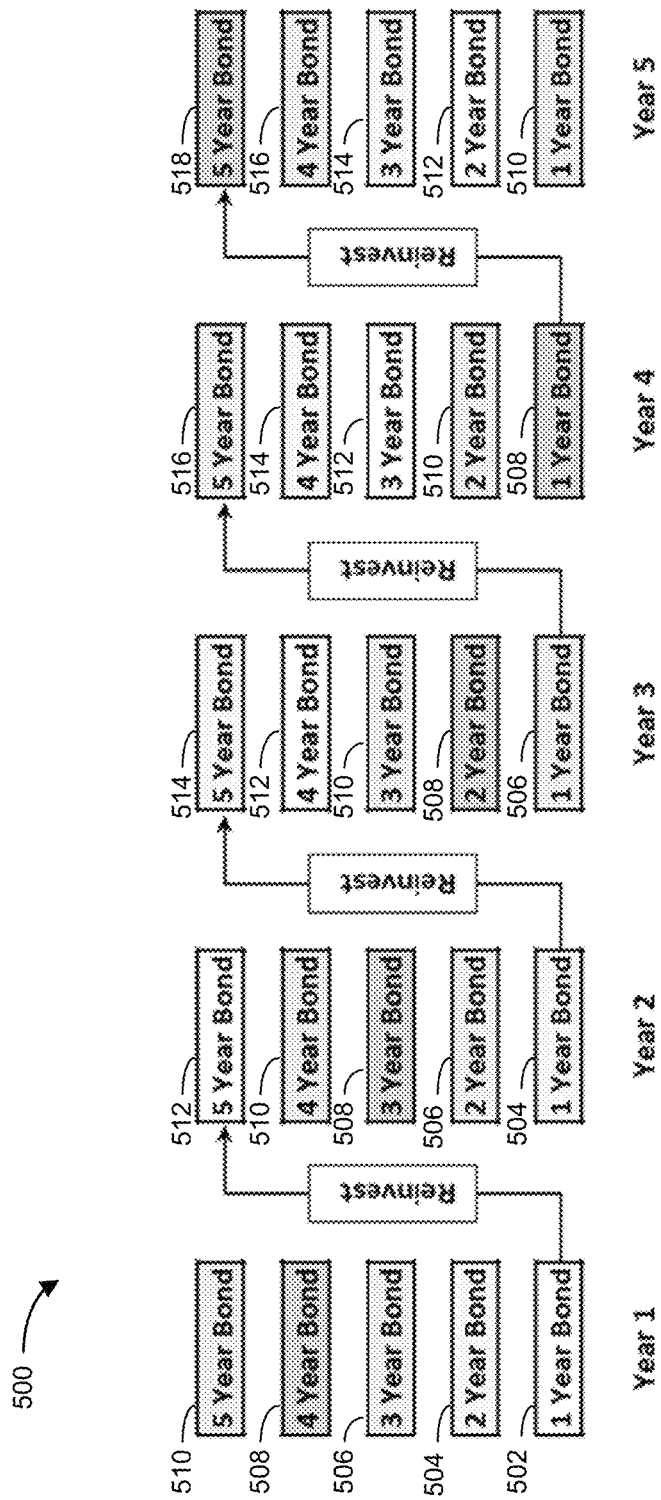
FIG. 5 is a schematic diagram of a customized investment strategy, according to an example embodiment

Referring now to FIG. 5, a schematic diagram of a customized investment strategy, shown as a bond ladder 500, is shown according to an example embodiment. A bond ladder 500 is a portfolio of individual bonds that mature on different dates (i.e., the maturity date). A ladder strategy is designed to provide current income while minimizing exposure to interest rate fluctuations. Instead of buying bonds that are scheduled to mature during the same year, an investor purchases bonds that mature at staggered future dates. Spreading out maturity dates can help prevent investors from trying to time the market. Further, reinvesting the proceeds and coupon payments from maturing bonds can help investors to ride out interest rate fluctuations.

In the shown embodiment, the bond ladder 500 includes five separate bonds during each year, all of which have a different maturity date. For example, in the first year, the bond ladder 500 includes a first bond 502 that matures at the end of year one, a second bond 504 that matures at the end of year two, a third bond 506 that matures at the end of year three, a fourth bond 508 that matures at the end of year four, and a fifth bond 510 that matures at the end of year 5. As shown, at the end of year one, when the first bond 502 matures, the money that is returned to the investor on the maturity date is reinvested into a sixth bond 512 that matures at the end of year 6. It should be appreciated that some or all of the proceeds may instead be paid to the investor instead of being reinvested. Further, at the end of year two when the second bond 504 matures, the proceeds may be reinvested into a seventh bond 514 that matures at the end of the seventh year. Similarly, at the end of year three when the third bond 506 matures, the proceeds may be reinvested into an eighth bond 516 that matures at the end of the eight year. Further, at the end of the fourth year when the fourth bond 508 matures, the proceeds may be reinvested into a ninth bond 518 that matures at the end of the ninth year.

Referring now to FIG. 6, a display screen of the first analyst device 104 (e.g., the analyst device 104) is shown according to an example embodiment. As shown, the display screen includes a graphical user interface (GUI) generated by the analyst application 132. The analyst application 132 generates a GUI (or interactive feature) provided on the same display screen as an accessed investment resource 350, which in this example, is shown as a liquidity screen for corporate bonds. It should be appreciated that the research resource may include, but is not limited to, charts, articles, PDFs, emails, word processing documents, etc. Further, it should be appreciated that only a portion of the investment research resource is shown in FIG. 4. For example, the analyst may scroll up or down on the first analyst device 104 to view more information embedded within the investment research resource.

As alluded to above, analyst application 132 generates a GUI that is displayed on the display screen of the first analyst device 104. In other embodiments, the GUI may be provided separate from the research resource. Beneficially, in the example shown, the analyst application 132 utilizes an application programing interface (API) or software development kit (SDK) to integrate with a web-browser on the analyst device 104 to enable the GUI to be generated and provided alongside online web browsing research. Further, in some embodiments, the analyst application 132 may operate in the background such that the analyst application 132 is not visible on the display screen of the first analyst device 104 when the web browsing is performed. The analyst application 132 may be configured to receive issuer ratings via the GUI.

As shown, the GUI of the analyst application 132 includes a plurality of issuer information fields. For example, as shown, the analyst application 132 includes an "industry" field, a "current price" field, a "PE ratio" field, a "profit margin" field, and a "debt/equity ratio" field. It should be appreciated that these fields are meant to be illustrative and should not be interpreted as limiting. The GUI may include other types of issuer information fields that may be used to analyze a security. Further, the GUI may not include any issuer information fields 360. The information that is collected via the GUI fields may be provided to the provider institution computing system 106 as part of process 200, as described above.

In certain embodiments, the issuer information fields 360 are automatically populated by the analyst application 132. For example, the analyst application 132 may access information from the investment resource 350 that is being viewed on the first analyst device 104. For example, if the analyst is viewing a Wall Street Journal article on the analyst device 104, the analyst application 132 may pull certain information from Yahoo! Finance and automatically populate the issuer information fields. The security information fields may then be displayed on the first analyst device 104 while the analyst is viewing the Wall Street Journal article on the security.

As shown, the GUI of the analyst application 132 also includes a plurality of issuer rating fields. For example, as shown, the analyst application 132 includes an "industry rating" field, a "profitability rating" field, a "valuation rating" field, a "growth rating" field, a "health rating" field, a "dividend rating" field, a "relative value" field, and a "fundamental recommendation" field. It should be appreciated that these fields are meant to be illustrative and should not be interpreted as limiting. For example, the GUI may include other types of issuer rating fields that are used to analyze a security.

It should be appreciated that in certain embodiments, the data provided from the first analyst device 104 to the provider institution computing system 106 during the customized investment strategy process 200 may be tied to a specific analyst device (e.g., the first analyst device 104)

and/or a specific investment team (e.g., the fundamental investment team). In this example, when the manager device 304 is used to access quality ratings, the manager device 304 may be able to view the data and which analyst device (e.g., the analyst device 104) the data was received from. However, in other embodiments, some or all of the data provided from the analyst device 104 to the provider institution computing system 106 may be anonymized. In other words, the data is not tied to a specific analyst device or a specific investment team. In this example, the manager device 304 may receive quality ratings that do not identify which analysts were involved in developing the quality ratings.

Referring now to FIG. 7, a display screen of the manager device 304 is shown according to an example embodiment. As shown, the display screen includes a graphical user interface (GUI) 460 generated by the manager application 332. The manager device 304, the manager application 332, and the corresponding GUI 460 may be utilized as a part of process 200 described above.

The operator of the manager device 304 may utilize the GUI 460 to submit investment parameters. Further, the display screen of the manager device 304 may be configured to display a list of potential customized investment strategies 450. For example, the list of customized investment strategies (i.e., scenarios) 450 may be provided to the manager device 304 from the provider institution computing system 106. The provider institution computing system 106 may provide the list of customized investment strategies to the manager device 304 based on the issuer ratings received from the analyst devices 104 and the investment parameters from the manager device 304. The customized investment strategies 450 may be optimized as described above. The operator of the manager device 304 may then select one of the customized investment strategies.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

In this regard, the circuit may include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components configured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include physical currencies, non-physical currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method processes, it is understood that the order of these processes may differ from what is depicted. For example, two or more processes may be performed concurrently or with partial concurrence. Also, some method processes that are performed as discrete processes may be combined, processes being performed as a combined process may be separated into discrete processes, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching processes, correlation processes, comparison processes and decision processes.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system, comprising:
a network interface circuit configured to enable data transmission over a network; and
a processing circuit coupled to the network interface circuit, the processing circuit comprising one or more processors coupled to non-transitory memory, wherein the processing circuit is configured to:
receive a plurality of issuer ratings associated with issuers, including a first issuer, from a plurality of analyst devices, wherein the plurality of issuer ratings include qualitative ratings that provide an indication of an analyst's opinion of each issuer;
generate numerical quality ratings for the issuers based on the qualitative ratings of the issuers;
receive a plurality of investment parameters from a manager device that is separate and distinct from the plurality of analyst devices, the plurality of investment parameters defining characteristics of a custom investment strategy;
generate a dataset regarding securities issued by the issuers based on the numerical quality ratings of the issuers, the dataset including securities issued by the issuers having a numerical quality rating over a pre-determined value;
generate the custom investment strategy by selecting securities from the dataset based on the numerical quality ratings and the plurality of investment parameters;
provide the custom investment strategy to the manager device, the custom investment strategy including a security issued by the first issuer;
receive an updated issuer rating from a first analyst device, the updated issuer rating including a qualitative rating for the first issuer and an analyst identifier associated with the first analyst device;
provide a notification to the manager device in response to receiving the updated issuer rating from the first analyst device, the notification including the analyst identifier associated with the first analyst device;
receive a selection from the manager device of the analyst identifier in the notification; and
launch at least one of an instant message, a chat box, an email, or a phone call based on the selection of the analyst identifier to cause a communication between the manager device and the first analyst device regarding the updated issuer rating from the first analyst device.

2. The computing system of claim 1, wherein generating the custom investment strategy further comprises selecting a plurality of bonds that each mature in a different year.

3. The computing system of claim 2, wherein the custom investment strategy is a bond ladder.

4. The computing system of claim 1, wherein the dataset is further generated based on a plurality of credit ratings assigned to the securities.

5. The computing system of claim 1, wherein generating the custom investment strategy includes optimizing the custom investment strategy for systematic tax loss harvesting.

6. The computing system of claim 1, wherein the processing circuit is further configured to:
receive updated issuer ratings from the plurality of analyst devices, wherein the updated issuer ratings include updated qualitative ratings that provide the indication of the analyst's opinion of the issuers;
generate updated numerical quality ratings for the issuers based on the updated issuer ratings, wherein the updated numerical quality ratings are a quantitative value generated based on the qualitative ratings of the issuers; and
update the custom investment strategy based on the updated numerical quality ratings.

7. A system, comprising:
a network interface circuit configured to facilitate data transmission over a network; and
a processing circuit comprising one or more processors coupled to non-transitory memory, wherein the processing circuit is configured to:
provide a plurality of analyst applications to a plurality of analyst computing devices, including a first analyst device, associated with a plurality of analysts, wherein each analyst application is configured to display a plurality of issuer rating fields;
receive issuer ratings associated with a plurality of issuers, including a first issuer, from the plurality of analyst applications of the plurality of analyst computing devices via the plurality of issuer rating fields, wherein the issuer ratings include qualitative ratings that provide an indication of an analyst's opinion of the plurality of issuers;

integrate the issuer ratings to generate quality ratings for the plurality of issuers based on the issuer ratings;

receive investment parameters from a manager device via a plurality of investment parameter fields, the investment parameters defining characteristics of a custom investment strategy;

generate a dataset regarding securities issued by the plurality of issuers based on the quality ratings of the plurality of issuers, the dataset including securities issued by issuers having a numerical quality rating over a predetermined value;

generate a plurality of custom investment strategies, including a first custom investment strategy including a security issued by the first issuer, by selecting securities from the dataset based on the quality ratings and the investment parameters;

provide the plurality of custom investment strategies to the manager device such that the plurality of custom investment strategies are presented within a graphical user interface, the first custom investment strategy including the security issued by the first issuer;

receive an updated issuer rating from the first analyst device, the updated issuer rating including a qualitative rating for the first issuer and an analyst identifier associated with the first analyst device;

provide a notification to the manager device in response to receiving the updated issuer rating from the first analyst device, the notification including the analyst identifier associated with the first analyst device;

receive a selection from the manager device of the analyst identifier in the notification; and launch at least one of an instant message, a chat box, an email, or a phone call based on the selection of the analyst identifier to cause a communication between the manager device and the first analyst device regarding the updated issuer rating from the first analyst device.

8. The system of claim 7, wherein the plurality of custom investment strategies includes bonds issued by the plurality of issuers.

9. The system of claim 8, wherein the plurality of custom investment strategies include a plurality of bond ladders.

10. The system of claim 7, wherein the dataset is further generated based on credit ratings of the securities, wherein the processing circuit is further configured to retrieve the credit ratings of the securities from an external database.

11. The system of claim 7, wherein generating the plurality of custom investment strategies includes optimizing the plurality of custom investment strategies for systematic tax loss harvesting.

12. A method, comprising:
providing, by a provider institution computing system, a plurality of analyst applications to a plurality of analyst computing devices, including a first analyst device, associated with a plurality of analysts, wherein each analyst application is configured to display a plurality of issuer rating fields;

receiving, by the provider institution computing system, issuer ratings associated with issuers from the plurality of analyst computing devices, wherein the issuer ratings include qualitative ratings that provide an indication of an analyst's opinion of the issuers;

integrating, by the provider institution computing system, the issuer ratings from the plurality of analyst computing devices to generate numerical quality ratings based on the issuer ratings;

receiving, by the provider institution computing system, a plurality of investment parameters from a manager device, the plurality of investment parameters defining characteristics of a custom investment strategy;

accessing, by the provider institution computing system, a security database including information regarding a plurality of securities issued by the issuers, wherein the security database further includes credit ratings for the plurality of securities;

generating, by the provider institution computing system, a dataset based on the credit ratings and the numerical quality ratings;

generating, by the provider institution computing system, the custom investment strategy by selecting securities from the dataset based on the numerical quality ratings and the plurality of investment parameters;

providing, by the provider institution computing system, the custom investment strategy to the manager device, the custom investment strategy including a security issued by a first issuer;

receiving, by the provider institution computing system, an updated issuer rating from the first analyst device, the updated issuer rating including a qualitative rating for the first issuer and an analyst identifier associated with the first analyst device;

providing, by the provider institution computing system, a notification to the manager device in response to receiving the updated issuer rating from the first analyst device, the notification including the analyst identifier associated with the first analyst device;

receiving, by the provider institution computing system, a selection from the manager device of the analyst identifier in the notification; and launching, by the provider institution computing system, at least one of an instant message, a chat box, an email, or a phone call based on the selection of the analyst identifier to cause a communication between the manager device and the first analyst device regarding the updated issuer rating from the first analyst device.

13. The method of claim 12, wherein the issuer ratings include a relative recommendation and a fundamental recommendation.

14. The method of claim 13, wherein the numerical quality ratings are generated based on an issuer quality rating matrix.

* * * * *